United States Patent
Hwang et al.

(10) Patent No.: US 11,052,750 B2
(45) Date of Patent: Jul. 6, 2021

(54) POWER TRANSMISSION SYSTEM FOR HYBRID ELECTRIC VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Seongwook Ji, Gunpo-si (KR); Ki Tae Kim, Incheon (KR); Chon Ok Kim, Yongin-si (KR); Soonki Eo, Ansan-si (KR); Wonmin Cho, Hwaseong-si (KR); Ilhan Yoo, Hwaseong-si (KR); Juhyeon Park, Gyeongsangnam-do (KR); Dongwoo Kim, Incheon (KR); Hye Jin Lim, Seoul (KR); Dong Hwan Hwang, Seoul (KR); Jong Hyo Park, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/804,451

(22) Filed: Feb. 28, 2020

(65) Prior Publication Data
US 2021/0023931 A1 Jan. 28, 2021

(30) Foreign Application Priority Data
Jul. 25, 2019 (KR) .................. 10-2019-0090443

(51) Int. Cl.
*B60K 6/54* (2007.10)
*B60K 6/547* (2007.10)
(Continued)

(52) U.S. Cl.
CPC ............. *B60K 6/547* (2013.01); *F16H 3/085* (2013.01); *F16H 37/0806* (2013.01); *B60K 6/38* (2013.01);
(Continued)

(58) Field of Classification Search
None
See application file for complete search history.

(56) References Cited

U.S. PATENT DOCUMENTS 7,249,537 B2 * 7/2007 Lee .................. B60L 50/16
74/661
7,395,735 B2 * 7/2008 Enstrom .............. B60L 50/16
74/661

(Continued)

FOREIGN PATENT DOCUMENTS

| EP | 3121483 B1 | 4/2019 | |
|---|---|---|---|
| EP | 3473463 A1 * | 4/2019 | ............. B60K 6/26 |
| EP | 3521083 A4 * | 10/2019 | ............. B60K 17/28 |

*Primary Examiner* — Dirk Wright
(74) *Attorney, Agent, or Firm* — Brinks Gilson & Lione (57) ABSTRACT

A power transmission apparatus of a hybrid electric vehicle using an engine and a motor/generator as power sources includes: a first input shaft selectively connected to a rotor of the motor/generator; a second input shaft disposed external to the first input shaft, and selectively connected to the rotor; an idle shaft disposed in parallel with the first input shaft; an intermediate shaft shifting rotational power transmitted from the first input shaft to the idle shaft; a first output shaft shifting and outputting rotational power transmitted from the second input shaft and the idle shaft; a second output shaft shifting and outputting rotational power transmitted from the first input shaft; and a plurality of gear sets shifting the rotational power input through the first and second input shafts.

16 Claims, 4 Drawing Sheets

(51) Int. Cl.
*F16H 3/085* (2006.01)
*F16H 37/08* (2006.01)
*B60K 6/38* (2007.10)

(52) U.S. Cl.
CPC ... *B60Y 2200/92* (2013.01); *F16H 2200/0078* (2013.01); *F16H 2200/0086* (2013.01); *F16H 2702/04* (2013.01)

(56) References Cited

U.S. PATENT DOCUMENTS

| | | | |
|---|---|---|---|
| 7,621,195 B2 * | 11/2009 | Hattori | F16H 3/006 74/330 |
| 8,323,142 B2 | 12/2012 | Masumoto | |
| 8,672,804 B2 * | 3/2014 | Okubo | B60L 50/16 477/5 |
| 9,003,905 B1 * | 4/2015 | Lee | F16H 3/093 74/330 |
| 9,145,952 B2 * | 9/2015 | Lee | F16H 3/12 |
| 9,518,633 B2 * | 12/2016 | Lee | F16H 3/006 |
| 9,605,731 B2 * | 3/2017 | Lee | F16H 3/006 |
| 9,849,771 B2 * | 12/2017 | Zhang | B60K 6/52 |
| 10,234,000 B2 * | 3/2019 | Lee | F16H 3/006 |
| 10,252,608 B2 * | 4/2019 | Liu | B60K 6/52 |
| 10,330,175 B2 * | 6/2019 | Lee | F16H 3/085 |
| 10,330,176 B2 * | 6/2019 | Lee | F16H 3/006 |
| 2013/0031990 A1 | 2/2013 | Singh et al. | |

\* cited by examiner

| Shift-stage | | Engagement element | | | SN1 | | | SN2 | | | SN3 | | | SN4 | |
|---|---|---|---|---|---|---|---|---|---|---|---|---|---|---|---|
| | | ECL | CL1 | CL2 | SG1 | N | SG3 | SG2 | N | SG6 | SG4 | N | SG5 | N |
| Engine mode / Parallel mode | FD1 | ● | ● | - | ● | - | - | ○ | ● | ○ | ○ | ● | ○ | ● |
| | FD2 | ● | - | ● | ○ | ● | ○ | ● | - | - | ○ | ● | ○ | ● |
| | FD3 | ● | ● | - | - | - | ● | ○ | ● | ○ | ○ | ● | ○ | ● |
| | FD4 | ● | - | ● | ○ | ● | ○ | ○ | ● | ○ | ● | - | ○ | ● |
| | FD5 | ● | ● | - | ○ | ● | ○ | ○ | ● | ○ | ○ | ● | ● | - |
| | FD6 | ● | - | ● | ○ | ● | ○ | - | - | ● | ○ | ● | ○ | ● |
| EV mode | FD1 | - | ● | - | ● | - | - | ○ | ● | ○ | ○ | ● | ○ | ● |
| | FD2 | - | - | ● | ○ | ● | ○ | ● | - | - | ○ | ● | ○ | ● |
| | FD3 | - | ● | - | - | - | ● | ○ | ● | ○ | ○ | ● | ○ | ● |
| | FD4 | - | - | ● | ○ | ● | ○ | ○ | ● | ○ | ● | - | ○ | ● |
| | FD5 | - | ● | - | ○ | ● | ○ | ○ | ● | ○ | ○ | ● | ● | - |
| | FD6 | - | - | ● | ○ | ● | ○ | - | - | ● | ○ | ● | ○ | ● |

○ : Preliminary engagement available

| Shift-stage | | Engagement element | | | SN1 | | | SN2 | | | SN3 | | | SN4 | |
|---|---|---|---|---|---|---|---|---|---|---|---|---|---|---|---|
| | | ECL | CL1 | CL2 | SG1 | N | SG3 | SG2 | N | SG6 | SG4 | N | RSG | SG5 | N |
| Engine mode / Parallel mode | REV | ● | - | ● | ○ | ● | ○ | ○ | ● | ○ | - | - | ● | ○ | ● |
| | FD1 | ● | ● | - | ● | - | - | ○ | ● | ○ | ○ | ● | ○ | ○ | ● |
| | FD2 | ● | - | ● | ○ | ● | ○ | ● | - | - | ○ | ● | ○ | ○ | ● |
| | FD3 | ● | ● | - | - | - | ● | ○ | ● | ○ | ○ | ● | ○ | ○ | ● |
| | FD4 | ● | - | ● | ○ | ● | ○ | ○ | ● | ○ | ● | - | - | ○ | ● |
| | FD5 | ● | ● | - | ○ | ● | ○ | ○ | ● | ○ | ○ | ● | ○ | ● | - |
| | FD6 | ● | - | ● | ○ | ● | ○ | - | - | ● | ○ | ● | ○ | ○ | ● |
| EV mode | REV | - | - | ● | ○ | ● | ○ | ○ | ● | ○ | - | - | ● | ○ | ● |
| | FD1 | - | ● | - | ● | - | - | ○ | ● | ○ | ○ | ● | ○ | ○ | ● |
| | FD2 | - | - | ● | ○ | ● | ○ | ● | - | - | ○ | ● | ○ | ○ | ● |
| | FD3 | - | ● | - | - | - | ● | ○ | ● | ○ | ○ | ● | ○ | ○ | ● |
| | FD4 | - | - | ● | ○ | ● | ○ | ○ | ● | ○ | ● | - | - | ○ | ● |
| | FD5 | - | ● | - | ○ | ● | ○ | ○ | ● | ○ | ○ | ● | ○ | ● | - |
| | FD6 | - | - | ● | ○ | ● | ○ | - | - | ● | ○ | ● | ○ | ○ | ● |

○ : Preliminary engagement available

POWER TRANSMISSION SYSTEM FOR HYBRID ELECTRIC VEHICLE

CROSS-REFERENCE TO RELATED APPLICATION

This application claims priority to and the benefit of Korean Patent Application No. 10-2019-0090443, filed on Jul. 25, 2019, the entire contents of which are incorporated herein by reference.

FIELD

The present disclosure relates to a power transmission apparatus for a vehicle. More particularly, the present disclosure relates to a power transmission apparatus for a vehicle for realizing multiple shift stages.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such future vehicle technology.

The DCT includes two clutch devices and a gear train of a manual transmission. The DCT selectively transmits torque input from an engine to two input shafts through two clutches, changes the torque selectively transmitted to the two input shafts through the gear train, and outputs the changed torque.

The DCT is used to realize a compact transmission achieving a forward speed stage higher than a fifth forward speed stage. The DCT is used as an automated manual transmission that does not require a driver's manual manipulation by controlling two clutches and synchronizing devices by a controller.

Compared with an automatic transmission with planetary gear sets, the DCT has excellent power delivery efficiency, simplifies change and addition of components for achieving multiple gear stages, and improves fuel economy.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for a vehicle for realizing multiple shift stages by adding four synchronizers in a dual clutch transmission structure and achieving the vehicle to run in an electric vehicle mode and a parallel hybrid mode by adding one motor/generator.

In one form of the present disclosure, a power transmission apparatus for a hybrid electric vehicle using an engine and a motor/generator as power sources may include: a first input shaft disposed coaxial with an output shaft of the engine and selectively connected to a rotor of the motor/generator; a second input shaft formed as a hollow shaft, disposed coaxial with and external to the first input shaft, and selectively connected to the rotor; an idle shaft disposed in parallel with the first input shaft; an intermediate shaft disposed in parallel with the first input shaft and the idle shaft and shifting rotational power transmitted from the first input shaft to the idle shaft; a first output shaft disposed in parallel with the second input shaft and the idle shaft, and shifting and outputting rotational power transmitted from the second input shaft and the idle shaft; a second output shaft disposed in parallel with the first input shaft and shifting and outputting rotational power transmitted from the first input shaft; and a plurality of gear sets disposed on the first and second input shafts, the idle shaft, the intermediate shaft, the first and second output shafts to shift the rotational power input through the first and second input shafts.

The plurality of gear sets may include: a first gear set including a first input gear fixedly connected to the first input shaft, and a fifth shifting gear disposed coaxial with and external to the second output shaft, externally gear-meshed with the first input gear and selectively synchronously connected to the second output shaft; a second gear set including a second input gear fixedly connected to the first input shaft, and a first external gear fixedly connected on the intermediate shaft and externally gear-meshed with the second input gear; a third gear set including a second external gear fixedly connected to the idle shaft, and a third shifting gear disposed coaxial with and external to the intermediate shaft, externally gear-meshed with the second external gear and selectively synchronously connected to the intermediate shaft; a fourth gear set including a third input gear fixedly connected to the second input shaft, and a fourth and sixth shifting gears disposed coaxial with and external to the first and second output shafts respectively, externally gear-meshed with the third input gear, and selectively synchronously connected to the first and second output shafts respectively; a fifth gear set including a third external gear fixedly connected to the idle shaft and a fifth external gear fixedly connected to the first output shaft and externally gear-meshed with the third external gear; a sixth gear set including a fourth input gear fixedly connected to the second input shaft, and a second shifting gear disposed coaxial with and external to the second output shaft, externally gear-meshed with the fourth input gear and selectively synchronously connected to the second output shaft; a seventh gear set including a fourth external gear fixedly connected to the idle shaft, and a first shifting gear disposed coaxial with and external to the intermediate shaft, externally gear-meshed with the fourth external gear and selectively synchronously connected to the intermediate shaft; and an eighth gear set including a final reduction gear of a differential, and first and second output gears fixedly connected to the first and second output shafts respectively and externally gear-meshed with the final reduction gear respectively.

In another form, the power transmission apparatus may further include four synchronizers for selectively synchronously connecting the first, second, third, fourth, fifth or sixth shifting gears to a corresponding shaft among the intermediate shaft, the first output shaft and the second output shaft. The four synchronizers may include: a first synchronizer selectively synchronously connecting the third shifting gear of the third gear set or the first shifting gear of the seventh gear set to the intermediate shaft; a second synchronizer selectively synchronously connecting the sixth shifting gear of the fourth gear set or the second shifting gear of the sixth gear set to the second output shaft; a third synchronizer selectively synchronously connecting the fourth shifting gear of the fourth gear set to the first output shaft; and a fourth synchronizer selectively synchronously connecting the fifth shifting gear of the first gear set to the second output shaft.

The plurality of gear sets may be arranged in the order of the first, second, third, fourth, fifth, sixth, seventh, and eighth gear sets from the opposite side of the engine and the third and fourth gear sets and the fifth and sixth gear sets may be disposed in the same row respectively.

The power transmission apparatus may realize an engine mode in which the engine is driven, an electric vehicle mode in which the motor/generator is driven, and a parallel mode in which the engine and the motor/generator are driven.

The power transmission apparatus may realize six forward speeds in each driving mode, and wherein the first and third shifting gears realizing a forward first speed and a forward third speed may be configured on the intermediate shaft to transfer the rotational power transmitted from the first input shaft to the first output shaft via the idle shaft.

The first and third shifting gears may selectively transfer the rotational power transmitted from the first input shaft through the second gear set to the idle shaft via the seventh and third gear set respectively, and the rotational power transmitted to the idle shaft may be transferred to the first output shaft via the fifth gear set.

In other form, the plurality of gear sets may include: a first gear set including a first input gear fixedly connected to the first input shaft, and a fifth shifting gear disposed coaxial with and external to the second output shaft, externally gear-meshed with the first input gear and selectively synchronously connected to the second output shaft; a second gear set including a second input gear fixedly connected to the first input shaft, and a first external gear fixedly connected on the intermediate shaft and externally gear-meshed with the second input gear; a third gear set including a second external gear fixedly connected to the idle shaft, and a third shifting gear disposed coaxial with and external to the intermediate shaft, externally gear-meshed with the second external gear and selectively synchronously connected to the intermediate shaft; a fourth gear set including a third input gear fixedly connected to the second input shaft, and a fourth and sixth shifting gears disposed coaxial with and external to the first and second output shafts respectively, externally gear-meshed with the third input gear, and selectively synchronously connected to the first and second output shafts respectively; a fifth gear set including a third external gear fixedly connected to the idle shaft and a fifth external gear fixedly connected to the first output and externally gear-meshed with the third external gear; a sixth gear set including a fourth input gear fixedly connected to the second input shaft, a second shifting gear disposed coaxial with and external to the second output shaft, externally gear-meshed with the fourth input gear and the second shifting gear selectively connected to the second output shaft, and a reverse shifting gear disposed coaxial with and external to the first output shaft, externally gear-meshed with the second shifting gear and the reverse shifting gear selectively connected to the first output shaft; a seventh gear set including a fourth external gear fixedly connected to the idle shaft, and a first shifting gear disposed coaxial with and external to the intermediate shaft, externally gear-meshed with the fourth external gear and selectively synchronously connected to the intermediate shaft; and an eighth gear set including a final reduction gear of a differential, and first and second output gears fixedly connected to the first and second output shafts respectively and externally gear-meshed with the final reduction gear respectively.

The power transmission apparatus may further include four synchronizers for selectively synchronously connecting the first, second, third, fourth, fifth, sixth, or reverse shifting gears to a corresponding shaft among the intermediate shaft, the first output shaft and the second output shaft. The four synchronizers may include: a first synchronizer selectively synchronously connecting the third shifting gear of the third gear set or the first shifting gear of the seventh gear set to the intermediate shaft, a second synchronizer selectively synchronously connecting the sixth shifting gear of the fourth gear set or the second shifting gear of the sixth gear set to the second output shaft, a third synchronizer selectively synchronously connecting the fourth shifting gear of the fourth gear set or the reverse shifting gear of the sixth gear set to the first output shaft, and a fourth synchronizer selectively synchronously connecting the fifth shifting gear of the first gear set to the second output shaft.

The plurality of gear sets may arranged in the order of the first, second, fifth, third, fourth, sixth, seventh and eighth gear sets from the opposite side of the engine, and the third and fourth gear sets are disposed in the same row.

The power transmission apparatus may realize six forward speeds in each driving mode among the engine mode, an electric vehicle mode and the parallel mode, and the first and third shifting gears realizing a forward first speed and a forward third speed may be configured on the intermediate shaft to transfer the rotational power transmitted from the first input shaft to the first output shaft via the idle shaft. The first and third shifting gears may selectively transfer the rotational power transmitted from the first input shaft through the second gear set to the idle shaft via the seventh and third gear sets respectively. The rotational power transmitted to the idle shaft may be transferred to the first output shaft via the fifth gear set. The power transmission apparatus may realize six forward speeds and one reverse speed in each driving mode, and the reverse shifting gear realizing the reverse speed may be configured on the first output shaft to receive the rotational power transmitted from the second input shaft via the second shifting gear on the second output shaft.

The power transmission apparatus according to an exemplary form of the present disclosure may realize multiple shift stages by adding four synchronizers in a dual clutch transmission structure and achieving the vehicle to run in an electric vehicle mode and a parallel hybrid mode by adding one motor/generator.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
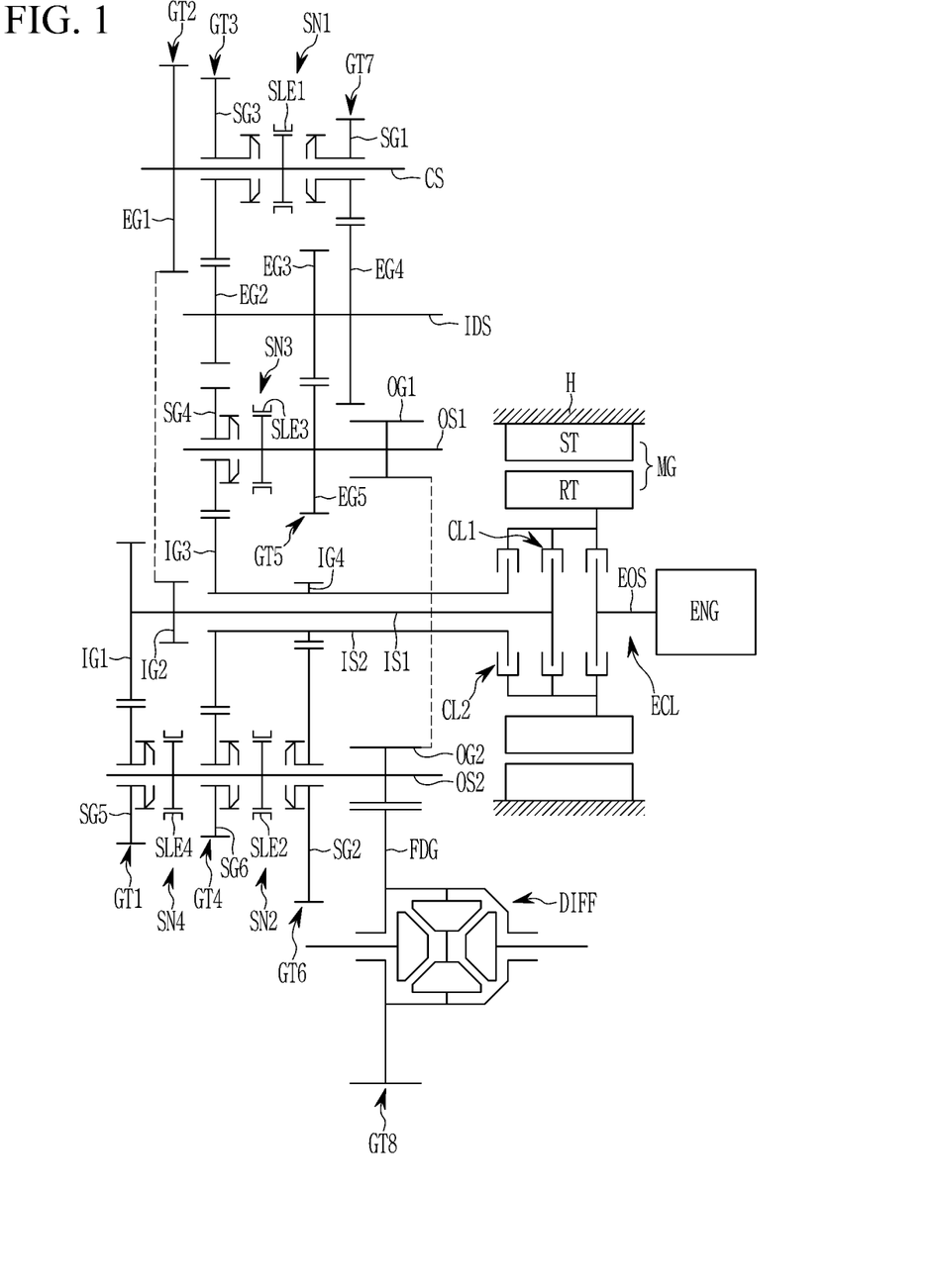
FIG. 1 is a schematic view of a power transmission apparatus for a vehicle according to a first exemplary form of the present disclosure.

FIG. 1 is a schematic view of a power transmission apparatus for a vehicle according to an exemplary form of the present disclosure.

Referring to FIG. 1, a power transmission apparatus for a vehicle according to a first exemplary form of the present disclosure shifts and outputs rotational powers of an engine ENG and a motor/generator MG, which are power sources, and includes first and second input shafts IS1, IS2, an idle shaft IDS, an intermediate shaft CS, first and second output shafts OS1 and OS2, and a plurality of gear sets GT1, GT2, GT3, GT4, GTS, GT6, GT7 and GT8.

The engine ENG is a primary power source and a variety of typical engines such as a gasoline engine or a diesel engine that uses fossil fuel may be used as the engine ENG.

The motor/generator MG serves as a motor and a generator as known in the art and includes a stator ST fixed to a transmission housing H, and a rotor RT rotatably supported inside the stator ST in the radial direction.

The rotor RT of the motor/generator MG is configured to be selectively connected to an engine output shaft EOS via an engine clutch ECL.

The rotational power of the engine ENG and motor/generator MG is selectively transmitted to the first input shaft IS1 and the second input shaft IS2 and shifted to a multiple of shift-stage through the first gear set GT1 to seventh gear set GT7 and then transmitted to first and second output shafts OS1 and OS2.

The first and second input shafts IS1 and IS2 are disposed on the same axis as the engine output shaft EOS, and the idle shaft IDS, the intermediate shaft CS and the first and second output shafts OS1 and OS2 are parallel to the first input shaft IS1.

The first input shaft IS1 is configured to be disposed coaxial with the engine output shaft EOS and selectively connected to the rotor RT of the motor/generator MG via the first clutch CL1, and is selectively connected with the engine output shaft EOS depending on whether the engine clutch ECL is operating or not.

That is, the first input shaft IS1 selectively receives the rotational power of engine ENG and the rotational power of the motor/generator MG.

The second input shaft IS2 is formed as a hollow shaft, disposed coaxial with and external to the first input shaft IS1, and selectively connected to the rotor RT via a second clutch CL2, and selectively receives the rotational power of engine ENG and the rotational power of the motor/generator MG.

The motor/generator MG is disposed coaxial with the engine output shaft EOS and is selectively connected with the first and second input shafts IS1 and IS2 via the rotor RT.

The idle shaft IDS is disposed parallel to the first input shaft IS1 and three external gears ES2, ES3, and ES4 are fixedly connected thereto.

The intermediate shaft CS is disposed between and in parallel to the first input shaft IS1 and the idle shaft IDS, configured to shift rotational power from the first input shaft IS1 and to transfer the rotational power to the idle shaft IDS.

The first output shaft OS1 is disposed between and in parallel to the second input shaft IS2 and the idle shaft IDS and rotational power from the second input shaft IS2 and the idle shaft IDS is shifted and transferred to a differential DIFF via the first output gear OG1 and a final reduction gear FDG.

The second output shaft OS2 is disposed parallel to the first input shaft IS1 and is configured to shift the rotational power transmitted from the first input shaft IS1 to the differential DIFF via the second output gear OG2 and the final reduction gear FDG.

The plurality of gear sets are disposed on the first and second input shafts IS1 and IS2, the idle shaft IDS, the intermediate shaft CS, and the first and second output shafts OS1 and OS2 and shift the rotational power input through the first and second input shafts IS1 and IS2.

The plurality of gear sets include and the first, second, third, fourth, fifth, sixth, seventh and eighth gear sets GT1, GT2, GT3, GT4, GTS, GT6, GT7, and GT8 disposed on the first and second input shafts IS1 and IS2, the idle shaft IDS, the intermediate shaft CS, and the first and second output shafts OS1 and OS2.

The first gear set GT1 includes a first input gear IG1 fixedly connected to the first input shaft IS1, and a fifth shifting gear SG5 disposed coaxial with and external to the second output shaft OS2, externally gear-meshed with the first input gear IG1 and selectively synchronously connected to the second output shaft OS2.

The second gear set GT2 includes a second input gear IG2 fixedly connected to the first input shaft IS1, and a first external gear EG1 fixedly connected on the intermediate shaft CS and externally gear-meshed with the second input gear IG2.

The third gear set GT3 includes a second external gear ES2 fixedly connected to the idle shaft IDS, and a third shifting gear SG3 disposed coaxial with and external to the intermediate shaft CS, externally gear-meshed with the second external gear EG2 and selectively synchronously connected to the intermediate shaft CS.

The fourth gear set GT4 includes a third input gear IG3 fixedly connected to the second input shaft IS2, and a fourth and sixth shifting gears SG4 and SG6 disposed coaxial with and external to the first and second output shafts OS1 and OS2 respectively, externally gear-meshed with the third input gear IG3, and selectively synchronously connected to the first and second output shafts OS1 and OS2 respectively.

The fifth gear set GT5 includes a third external gear ES3 fixedly connected to the idle shaft IDS and a fifth external gear ES5 fixedly connected to the first output OS1 and externally gear-meshed with the third external gear ES3.

The sixth gear set GT6 includes a fourth input gear IG4 fixedly connected to the second input shaft IS2, and a second shifting gear SG2 disposed coaxial with and external to the second output shaft OS2, externally gear-meshed with the fourth input gear IG4 and selectively synchronously connected to the second output shaft OS2.

The seventh gear set GT7 includes a fourth external gear ES4 fixedly connected to the idle shaft IDS, and a first shifting gear SG1 disposed coaxial with and external to the intermediate shaft CS, externally gear-meshed with the fourth external gear ES4 and selectively synchronously connected to the intermediate shaft CS.

The eighth gear set GE8 includes the final reduction gear FDG of the differential DIFF, and first and second output gears OG1 and OG2 fixedly connected to the first and second output shafts OS1 and OS2 respectively and externally gear-meshed with the final reduction gear FDG respectively.

Gear ratios of the first to eighth gear sets GT1 to GT8 may be set in consideration of design requirements of a transmission.

In an exemplary form of the present disclosure, three clutches ECL, CL1 and CL2, are disposed on the part that selectively transfer the rotational power. The engine clutch ECL is disposed between the engine output shaft EOS and the rotor RT of the motor/generator MG to selectively connect the engine output shaft EOS and the rotor RT of the motor/generator MG.

The first clutch CL1 is disposed between the first input shaft IS1 and the rotor RT of the motor/generator MG to selectively connect the first input shaft IS1 and the rotor RT of the motor/generator MG.

In the state of operating of the engine clutch ECL, the rotational power of the engine is selectively transmitted to the first input shaft IS1 depending on the operation of the first clutch CL1.

The second clutch CL2 is disposed between the second input shaft IS2 and the rotor RT of the motor/generator MG to selectively connect the second input shaft IS2 and the rotor RT of the motor/generator MG.

In the state of operating of the engine clutch ECL, the rotational power of the engine is selectively transmitted to the second input shaft IS2 depending on the operation of the second clutch CL2.

The engagement elements of the engine clutch ECL and the first and second clutches CL1 and CL2 may be realized as multi-plate hydraulic pressure friction devices that are frictionally engaged by hydraulic pressure, however, it should not be understood to be limited thereto, since various other configuration that are electrically controllable may be available.

The power transmission apparatus may further include four synchronizers SN1, SN2, SN3 and SN4 for selectively synchronous connecting the shifting gears to the shaft.

The first synchronizer SN1 selectively synchronously connects the third shifting gear SG3 of the third gear set GT3 or the first shifting gear SG1 of the seventh gear set GT7 to the intermediate shaft CS. The second synchronizer SN2 selectively synchronously connects the sixth shifting gear SG6 of the fourth gear set GT4 or the second shifting gear SG2 of the sixth gear set GT6 to the second output shaft OS2.

The third synchronizer SN3 selectively synchronously connects the fourth shifting gear SG4 of the fourth gear set GT4 to the first output shaft OS1.

The fourth synchronizer SN4 selectively synchronously connects the fifth shifting gear SG5 of the first gear set GT1 to the second output shaft OS2.

The first, second, third and fourth synchronizers SN1, SN2, SN3 and SN4 may be formed as a known scheme, and first, second, third and fourth sleeves SLE1, SLE2, SLE3 and SLE4 applied to the first, second, third and fourth synchronizers SN1, SN2, SN3 and SN4 may be operated by actuators (not shown) that may be controlled by a transmission control unit.

In the first exemplary form, the plurality of gear sets GT1 to GT8 are arranged in the order of the first, second, third, fourth, fifth, sixth, seventh, and eighth gear sets GT1, GT2, GT3, GT4, GTS, GT6, GT7 and GT8 from the opposite side of the engine. And the third and fourth gear sets GT3 and GT4 and the fifth and sixth gear sets GT5 and GT6 are disposed in the same row respectively so that overall length of the transmission apparatus may be reduced.

Figure 2:
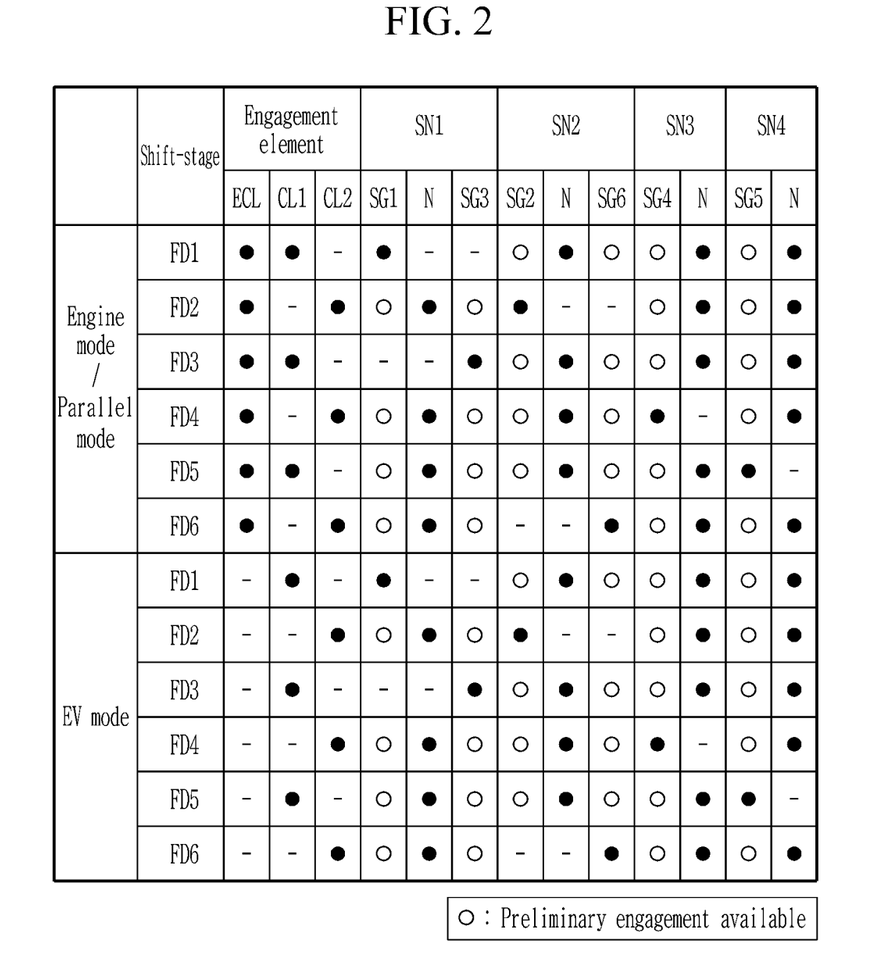
FIG. 2 is a shifting operational chart for a power transmission apparatus for a vehicle according to a first exemplary form of the present disclosure.

FIG. 2 is a shifting operational chart for a power transmission apparatus for a vehicle according to a first exemplary form of the present disclosure.

The power transmission apparatus for a vehicle according to a first exemplary form of the present disclosure may implement an engine mode in which the vehicle is driven by the rotational power of then engine ENG, an electric vehicle mode EV mode in which the vehicle is driven by the rotational power of the motor/generator MG, and a parallel mode in which the vehicle is driven by the rotational power of the engine ENG and the motor/generator MG. The sixth speed shift-stage can be implemented for each mode by the selective operation of the engagement elements including the three clutches ECL, CL1 and CL2 and the four synchronizers SN1, SN2, SN3 and SN4.

Thus, in implementing the shift-stage of the forward sixth speed for each mode, particularly, the first and third shifting gears SG1 and SG3 that implement the shift-stage of the forward first speed FD1 and the forward third speed FD3 are configured on the intermediate shaft CS to transfer the rotational power from the first input shaft IS1 to the first output shaft OS1 via the idle shaft IDS.

That is, the first and third shifting gears SG1 and SG3 selectively transfer the rotational power transmitted from the first input shaft IS1 via the second gear set GT2 to the idle shaft IDS via the seventh and third gear sets GT7 and GT3 respectively, and then transfer to the first output shaft OS1 through the fifth gear set GTS.

[The Forward First Speed]

In the forward first speed FD1 in engine mode as shown in FIG. 2, while the engine clutch ECL and the first clutch CL1 are simultaneously operated, the first synchronizer SN1 is controlled to synchronously connect the first shifting gear SG1 and the intermediate shaft CS.

Accordingly, the rotational power of engine ENG is transmitted from the engine output shaft EOS to the first input shaft IS1, the second gear set GT2 and the intermediate shaft CS by the operation of engine clutch ECL and the first clutch CL1.

The rotational power transmitted to the intermediate shaft CS is transferred to the seventh gear set GT7, the idle shaft IDS, the fifth gear set GT5 and the first output shaft OS1 by the operation of the first synchronizer SN1 and is output to the differential DIFF via the eighth gear set GT8. And thus, the forward first speed is achieved.

In the forward first speed FD1 of the engine mode, it is assumed that the vehicle is driven by driving torque of the engine ENG. However, when the torque assist of the motor/generator MG is added, a parallel hybrid mode may be implemented.

In addition, if the engine clutch ECL is released, the engine ENG is stopped and only the motor/generator MG is driven, the forward first speed FD1 of the electric vehicle mode EV mode can be implemented using only the driving torque of the motor/generator MG. At this time, if the motor/generator MG is driven in reverse rotation, reverse shifting may be realized.

As such, since the forward first speed FD1 of the electric vehicle mode EV mode is the same as the shift of the forward first speed FD1 of the engine mode, detailed description will be omitted.

[The Forward Second Speed]

In the forward second speed FD2 in engine mode as shown in FIG. 2, while the engine clutch ECL and the second clutch CL2 are simultaneously operated, the second synchronizer SN2 is controlled to synchronously connect the second shifting gear SG2 and the second output shaft OS2.

Accordingly, the rotational power of engine ENG is transmitted from the engine output shaft EOS to the second input shaft IS2, the sixth gear set GT6 and the second output shaft OS2 by the operation of the engine clutch ECL, the second clutch CL2 and the second synchronizer SN2, and is output to the differential DIFF via the eighth gear set GT8. And thus, the forward second speed is achieved.

In the forward second speed FD2 of the engine mode, it is assumed that the vehicle is driven by driving torque of the engine ENG. However, when the torque assist of the motor/generator MG is added, a parallel hybrid mode may be implemented.

In addition, if the engine clutch ECL is released, the engine ENG is stopped and only the motor/generator MG is driven, the forward second speed FD2 of the electric vehicle mode EV mode can be implemented using only the driving torque of the motor/generator MG.

As such, since the forward second speed FD2 of the electric vehicle mode EV mode is the same as the shift of the forward second speed FD2 of the engine mode, detailed description will be omitted.

[The Forward Third Speed]

In the forward third speed FD3 in engine mode as shown in FIG. 2, while the engine clutch ECL and the first clutch CL1 are simultaneously operated, the first synchronizer SN1 is controlled to synchronously connect the third shifting gear SG3 and the intermediate shaft CS.

Accordingly, the rotational power of engine ENG is transmitted from the engine output shaft EOS to the first input shaft IS1, the second gear set GT2 and the intermediate shaft CS by the operation of engine clutch ECL and the first clutch CL1.

The rotational power transmitted to the intermediate shaft CS is transferred to the third gear set GT3, the idle shaft IDS, the fifth gear set GT5 and the first output shaft OS1 by the operation of the first synchronizer SN1, and is output to the differential DIFF via the eighth gear set GT8. And thus, the forward third speed is achieved.

In the forward third speed FD3 of the engine mode, it is assumed that the vehicle is driven by driving torque of the engine ENG. However, when the torque assist of the motor/generator MG is added, a parallel hybrid mode may be implemented.

In addition, if the engine clutch ECL is released, the engine ENG is stopped and only the motor/generator MG is driven, the forward third speed FD3 of the electric vehicle mode EV mode can be implemented using only the driving torque of the motor/generator MG.

As such, since the forward third speed FD3 of the electric vehicle mode EV mode is the same as the shift of the forward third speed FD3 of the engine mode, detailed description will be omitted.

[The Forward Fourth Speed]

In the forward fourth speed FD4 in engine mode as shown in FIG. 2 while the engine clutch ECL and the second clutch CL2 are simultaneously operated, the third synchronizer SN3 is controlled to synchronously connect the third shifting gear SG3 and the first output shaft OS1.

Accordingly, the rotational power of engine ENG is transferred from the engine output shaft EOS to the second input shaft IS2, the fourth gear set GT4, and the first output shaft OS1 by the operation of the engine clutch ECL, the second clutch CL2 and the third synchronizer SN3, and is output to the differential DIFF via the eighth gear set GT8. And thus, the forward fourth speed is achieved.

In the forward fourth speed FD4 of the engine mode, it is assumed that the vehicle is driven by driving torque of the engine ENG. However, when the torque assist of the motor/generator MG is added, a parallel hybrid mode may be implemented.

In addition, if the engine clutch ECL is released, the engine ENG is stopped and only the motor/generator MG is driven, the forward fourth speed FD4 of the electric vehicle mode EV mode can be implemented using only the driving torque of the motor/generator MG.

As such, since the forward fourth speed FD4 of the electric vehicle mode EV mode is the same as the shift of the forward fourth speed FD4 of the engine mode, detailed description will be omitted.

[The Forward Fifth Speed]

In the forward fifth speed FD5 in engine mode as shown in FIG. 2, while the engine clutch ECL and the first clutch CL1 are simultaneously operated, the fourth synchronizer SN4 is controlled to synchronously connect the fifth shifting gear SG5 and the second output shaft OS2.

Accordingly, the rotational power of engine ENG is transferred from the engine output shaft EOS to the first input shaft IS1, the first gear set GT1 and thee second output shaft OS2 by the operation of the engine clutch ECL, the first clutch CL1 and the fourth synchronizer SN4, and is output to the differential DIFF via the eighth gear set GT8. And thus, the forward fifth speed is achieved.

In the forward fifth speed FD5 of the engine mode, it is assumed that the vehicle is driven by driving torque of the engine ENG. However, when the torque assist of the motor/generator MG is added, a parallel hybrid mode may be implemented.

In addition, if the engine clutch ECL is released, the engine ENG is stopped and only the motor/generator MG is driven, the forward fifth speed FD5 of the electric vehicle mode EV mode can be implemented using only the driving torque of the motor/generator MG.

As such, since the forward fifth speed FD5 of the electric vehicle mode EV mode is the same as the shift of the forward fifth speed FD5 of the engine mode, detailed description will be omitted.

[The Forward Sixth Speed]

In the forward sixth speed FD6 in engine mode as shown in FIG. 2, while the engine clutch ECL and the second clutch CL2 are simultaneously operated, the second synchronizer SN2 is controlled to synchronously connect the sixth shifting gear SG6 and the second output shaft OS2.

Accordingly, the rotational power of engine ENG is transferred from the engine output shaft EOS to the second input shaft IS2, the fourth gear set GT4 and to the second output shaft OS2 by the operation of the engine clutch ECL, the second clutch CL2 and the second synchronizer SN2, and is output to the differential DIFF via the eighth gear set GT8. And thus, the forward sixth speed is achieved.

In the forward sixth speed FD6 of the engine mode, it is assumed that the vehicle is driven by driving torque of the engine ENG. However, when the torque assist of the motor/generator MG is added, a parallel hybrid mode may be implemented.

In addition, if the engine clutch ECL is released, the engine ENG is stopped and only the motor/generator MG is driven, the forward sixth speed FD6 of the electric vehicle mode EV mode can be implemented using only the driving torque of the motor/generator MG.

As such, since the forward sixth speed FD6 of the electric vehicle mode EV mode is the same as the shift of the forward sixth speed FD6 of the engine mode, detailed description will be omitted.

Figure 3:
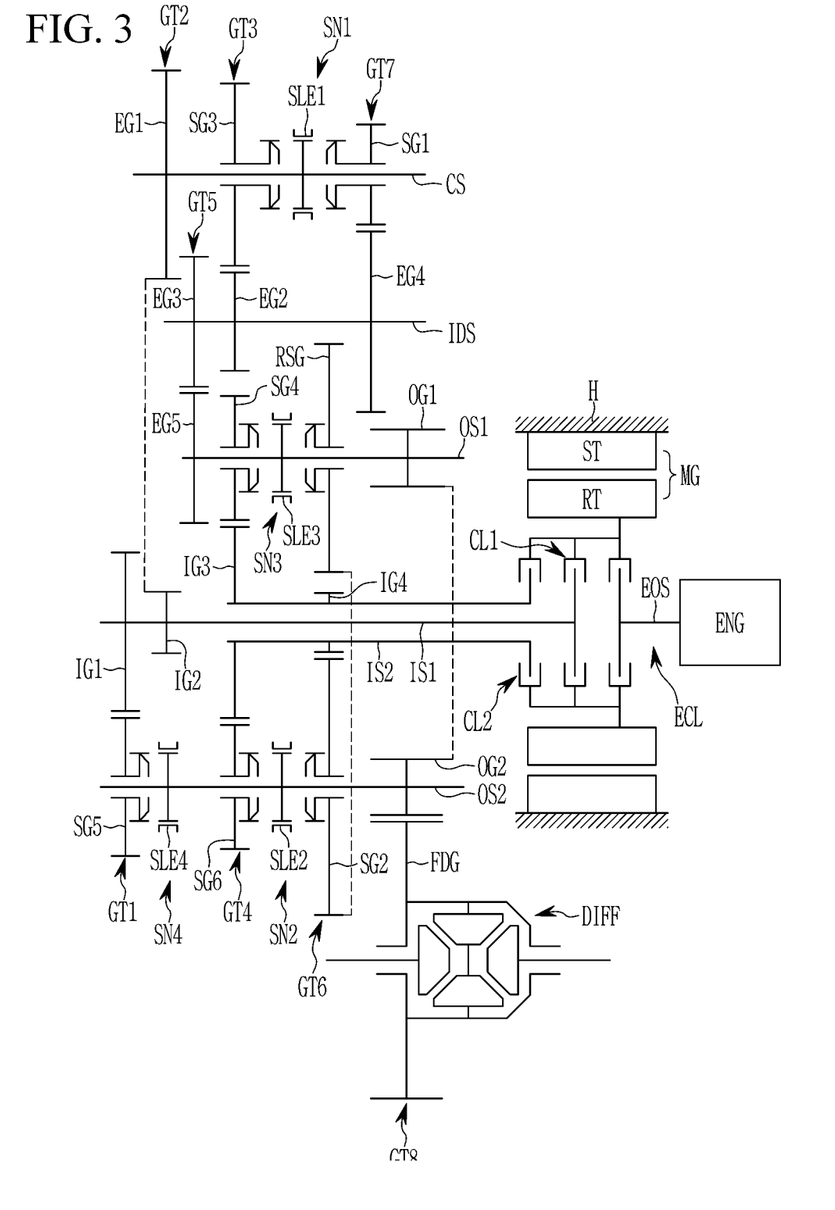
FIG. 3 is a schematic view of a power transmission apparatus for a vehicle according to a second exemplary form of the present disclosure.

FIG. 3 is a schematic view of a power transmission apparatus for a vehicle according to a second exemplary form of the present disclosure.

Referring to FIG. 3, in the power transmission apparatus according to the second exemplary form of the present disclosure, comparing the configuration of the first exemplary form, there is a difference that a reverse shifting gear RSG is added to the sixth gear set GT6.

That is, the sixth gear set GT6 including the fourth input gear IG4 fixedly connected to the second input shaft IS2 and the second shifting gear SG2 disposed coaxial with and external to the second output shaft OS2, externally gear-meshed with the fourth input gear IG4 and selectively synchronously connected to the second output shaft OS2 further includes a reverse shifting gear RSG disposed coaxial with and external to the first output shaft OS1 without rotational interference, externally gear-meshed with the second shifting gear SG2, and selectively connected to the first output shaft OS1.

Accordingly, the third synchronizer SN3 may selectively synchronously connect the fourth shifting gear SG4 of the fourth gear set GT4 to the first output shaft OS1, or may connect the reverse shifting gear RSG of the sixth gear set GT6 to the first output shaft OS1.

Meanwhile, as the reverse shifting gear RSG is additionally configured to the sixth gear set GT6, the fifth gear set GT5 positioned in the same row as the sixth gear set GT6 in the first form is disposed between the second gear set GT2 and the third gear set GT3 in the second exemplary forms.

That is, the fifth gear set GT5 only changes the position of the row and has the same configuration as the first exemplary form. That is, the fifth gear set GT5 includes the third external gear ES3 fixedly connected to the idle shaft IDS and the fifth external gear ES5 fixedly connected to the first output OS1 and externally gear-meshed with the third external gear ES3.

The power transmission apparatus of the vehicle according to the second exemplary form of the present disclosure is the same as the configuration of the first exemplary form except that the reverse shifting gear RSG is added to the sixth gear set GT6 as compared to the first exemplary form. And thus, detailed description will be omitted.

Figure 4:
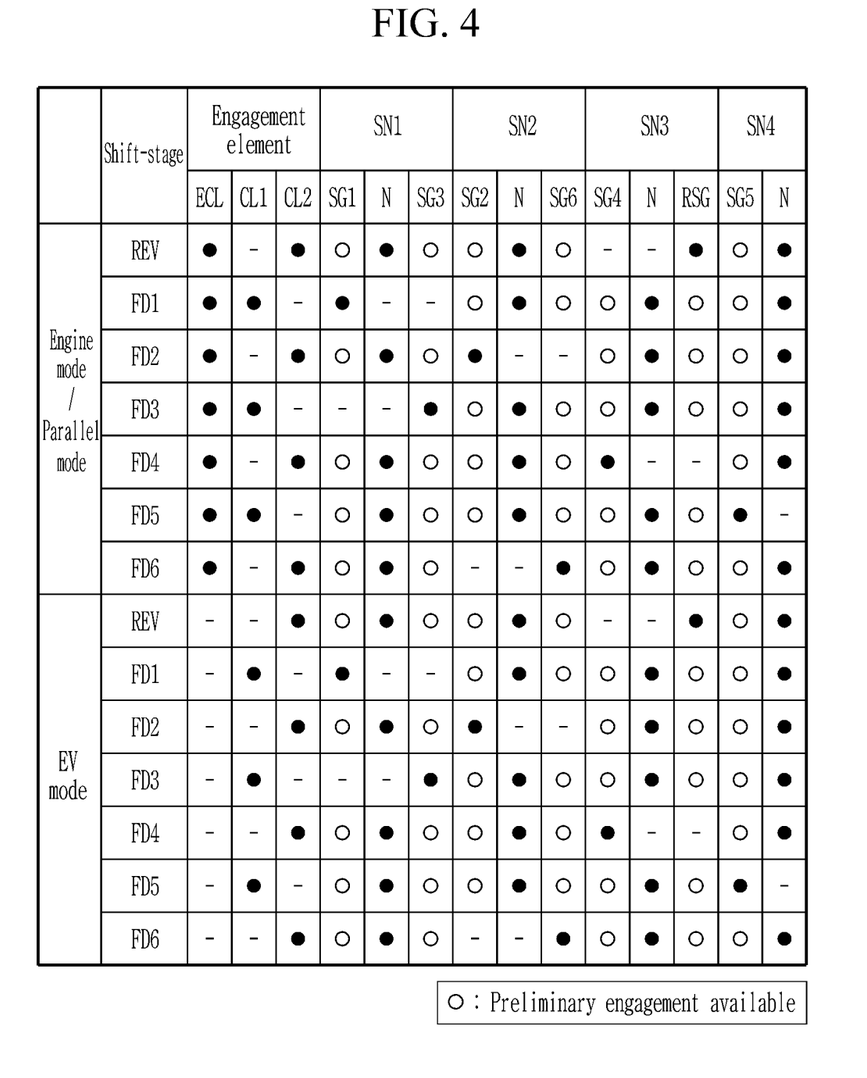
FIG. 4 is a shifting operational chart for a power transmission apparatus for a vehicle according to a second exemplary form of the present disclosure.

FIG. 4 is a shifting operational chart for a power transmission apparatus for a vehicle according to a second exemplary form of the present disclosure. The power transmission apparatus of the vehicle according to the second exemplary form of the present disclosure is the same as that of the first exemplary form in the forward first speed FD1 to the forward sixth speed FD6 shift-stage. With the additional configuration of the reverse shifting gear RSG, there is a difference that the reverse REV shift-stage is added.

That is, shift-stages from the forward first speed FD1 to the forward sixth speed FD6 other than the reverse REV shift-stage is implemented in the same manner as the first exemplary form, and the detailed description is omitted and only reverse speed is described.

[Reverse Speed]

In the reverse speed REV in engine mode, as shown in FIG. 4, while the engine clutch ECL and the second clutch CL2 are simultaneously operated, the third synchronizer SN3 is controlled to synchronously connect the reverse shifting gear RSG and the first output shaft OS1.

Accordingly, the rotational power of engine ENG is transmitted from the engine input shaft EOS to the second input shaft IS2, the fourth input gear IG4 of the sixth gear set GT6, the second shifting gear SG2, the reverse shifting gear RSG and the first output shaft OS1 by the operation of the engine clutch ECL, thee second clutch CL2 and the third synchronizer SN3, and is output to the differential DIFF via the eighth gear set GT8. And thus, the reverse speed is achieved.

In the reverse speed REV of the engine mode, it is assumed that the vehicle is driven by driving torque of the engine ENG. However, when the torque assist of the motor/generator MG is added, a parallel hybrid mode may be implemented.

In addition, if the engine clutch ECL is released, the engine ENG is stopped and only the motor/generator MG is driven, the reverse speed REV of the electric vehicle mode EV mode can be implemented using only the driving torque of the motor/generator MG.

As such, since the reverse speed REV of the electric vehicle mode EV mode is the same as the shift of the reverse speed REV of the engine mode, detailed description will be omitted.

The power transmission apparatus according to the exemplary forms of the present disclosure may realize multiple shift stages by adding four synchronizers in a dual clutch transmission structure and achieving the vehicle to run in an electric vehicle mode and a parallel hybrid mode by adding one motor/generator.

Since the first and third shifting gears SG1 and SG3 that implement the shift-stage of the forward first speed FD1 and the forward third speed FD3 may be configured on the intermediate shaft CS to transfer the rotational power from the first input shaft IS1 to the first output shaft OS1 via the idle shaft IDS, and thus the overall length of the transmission can be reduced, thereby iinstallability may be improved.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

EOS: engine output shaft
IS1,IS2: first, second input shafts
CS: intermediate shaft
OS1,OS2: first, second output shafts
IDS: idle shaft
CL1,CL2: first, second clutches
ECL: engine clutch
GT1,GT2,GT3,GT4,GT5,GT6,GT7,GT8: first, second, third, fourth, fifth, sixth, seventh, eighth gear sets
IG1,IG2,IG3,IG4: first, second, third, fourth input gears
EG1,EG2,EG3,EG4,EG5: first, second, third, fourth, fifth external gears
SG1,SG2,SG3,SG4,SG5,SG6: first, second, third, fourth, fifth, sixth shifting gears
RSG: reverse shifting gear
OG1,OG2: first, second output gears
SN1,SN2,SN3,SN4: first, second, third, fourth synchronizers
MG: motor/generator
FDG: final reduction gear
DIFF . . . differential

What is claimed is:

1. A power transmission apparatus for a hybrid electric vehicle using an engine and a motor/generator as power sources, the power transmission apparatus comprising:
   a first input shaft disposed coaxial with an output shaft of the engine and selectively connected to a rotor of the motor/generator ;
   a second input shaft formed as a hollow shaft, disposed coaxial with and external to the first input shaft, and selectively connected to the rotor;
   an idle shaft disposed in parallel with the first input shaft;
   an intermediate shaft disposed in parallel with the first input shaft and the idle shaft and configured to shift rotational power transmitted from the first input shaft to the idle shaft;
   a first output shaft disposed in parallel with the second input shaft and the idle shaft, and configured to shift and output rotational power transmitted from the second input shaft and the idle shaft;
   a second output shaft disposed in parallel with the first input shaft and configured to shift and output rotational power transmitted from the first input shaft; and
   a plurality of gear sets disposed on the first and second input shafts, the idle shaft, the intermediate shaft, the first and second output shafts to shift the rotational power through the first and second input shafts.

2. The power transmission apparatus of claim 1, wherein the plurality of gear sets comprise:
   a first gear set including a first input gear fixedly connected to the first input shaft, and a fifth shifting gear disposed coaxial with and external to the second output shaft, externally gear-meshed with the first input gear and selectively synchronously connected to the second output shaft;
   a second gear set including a second input gear fixedly connected to the first input shaft, and a first external gear fixedly connected on the intermediate shaft and externally gear-meshed with the second input gear;
   a third gear set including a second external gear fixedly connected to the idle shaft, and a third shifting gear disposed coaxial with and external to the intermediate shaft, externally gear-meshed with the second external gear and selectively synchronously connected to the intermediate shaft;
   a fourth gear set including a third input gear fixedly connected to the second input shaft, and a fourth and sixth shifting gears disposed coaxial with and external to the first and second output shafts respectively, externally gear-meshed with the third input gear, and selectively synchronously connected to the first and second output shafts respectively;
   a fifth gear set including a third external gear fixedly connected to the idle shaft and a fifth external gear fixedly connected to the first output shaft and externally gear-meshed with the third external gear;
   a sixth gear set including a fourth input gear fixedly connected to the second input shaft, and a second shifting gear disposed coaxial with and external to the second output shaft, externally gear-meshed with the fourth input gear and selectively synchronously connected to the second output shaft;
   a seventh gear set including a fourth external gear fixedly connected to the idle shaft, and a first shifting gear disposed coaxial with and external to the intermediate shaft, externally gear-meshed with the fourth external gear and selectively synchronously connected to the intermediate shaft; and
   an eighth gear set including a final reduction gear of a differential, and first and second output gears fixedly connected to the first and second output shafts respectively and externally gear-meshed with the final reduction gear respectively.

3. The power transmission apparatus of claim 2, further comprises four synchronizers for selectively synchronously connecting the first, second, third, fourth, fifth or sixth shifting gears to a corresponding shaft among the intermediate shaft, the first output shaft and the second output shaft.

4. The power transmission apparatus of claim 3, wherein the four synchronizers comprise:
   a first synchronizer selectively synchronously connecting the third shifting gear of the third gear set or the first shifting gear of the seventh gear set to the intermediate shaft;
   a second synchronizer selectively synchronously connecting the sixth shifting gear of the fourth gear set or the second shifting gear of the sixth gear set to the second output shaft;
   a third synchronizer selectively synchronously connecting the fourth shifting gear of the fourth gear set to the first output shaft; and
   a fourth synchronizer selectively synchronously connecting the fifth shifting gear of the first gear set to the second output shaft.

5. The power transmission apparatus of claim 2, wherein:
   the plurality of gear sets are arranged in the order of the first, second, third, fourth, fifth, sixth, seventh, and eighth gear sets from an opposite side of the engine; and
   the third and fourth gear sets and the fifth and sixth gear sets are disposed in the same row respectively.

6. The power transmission apparatus of claim 2, wherein the power transmission apparatus realizes an engine mode in which the engine is driven, an electric vehicle mode in which the motor/generator is driven, and a parallel mode in which the engine and the motor/generator are driven.

7. The power transmission apparatus of claim 6, wherein the power transmission apparatus realizes six forward speeds in each driving mode, and wherein the first and third shifting gears realizing a forward first speed and a forward third speed are configured on the intermediate shaft to transfer the rotational power transmitted from the first input shaft to the first output shaft via the idle shaft.

8. The power transmission apparatus of claim 6, wherein:

the first and third shifting gears selectively transfer the rotational power transmitted from the first input shaft through the second gear set to the idle shaft via the seventh and third gear set respectively; and the rotational power transmitted to the idle shaft is transferred to the first output shaft via the fifth gear set.

9. The power transmission apparatus of claim 1, wherein the plurality of gear sets comprise:

a first gear set including a first input gear fixedly connected to the first input shaft, and a fifth shifting gear disposed coaxial with and external to the second output shaft, externally gear-meshed with the first input gear and selectively synchronously connected to the second output shaft;

a second gear set including a second input gear fixedly connected to the first input shaft, and a first external gear fixedly connected on the intermediate shaft and externally gear-meshed with the second input gear;

a third gear set including a second external gear fixedly connected to the idle shaft, and a third shifting gear disposed coaxial with and external to the intermediate shaft, externally gear-meshed with the second external gear and selectively synchronously connected to the intermediate shaft;

a fourth gear set including a third input gear fixedly connected to the second input shaft, and fourth and sixth shifting gears disposed coaxial with and external to the first and second output shafts respectively, externally gear-meshed with the third input gear, and selectively synchronously connected to the first and second output shafts respectively;

a fifth gear set including a third external gear fixedly connected to the idle shaft and a fifth external gear fixedly connected to the first output shaft and externally gear-meshed with the third external gear;

a sixth gear set including a fourth input gear fixedly connected to the second input shaft, a second shifting gear disposed coaxial with and external to the second output shaft, externally gear-meshed with the fourth input gear and the second shifting gear selectively connected to the second output shaft, and a reverse shifting gear disposed coaxial with and external to the first output shaft, externally gear-meshed with the second shifting gear and the reverse shifting gear selectively connected to the first output shaft;

a seventh gear set including a fourth external gear fixedly connected to the idle shaft, and a first shifting gear disposed coaxial with and external to the intermediate shaft, externally gear-meshed with the fourth external gear and selectively synchronously connected to the intermediate shaft; and an eighth gear set including a final reduction gear of a differential, and first and second output gears fixedly connected to the first and second output shafts respectively and externally gear-meshed with the final reduction gear respectively.

10. The power transmission apparatus of claim 9, further comprises four synchronizers for selectively synchronous connecting the first, second, third, fourth, fifth, sixth, or reverse shifting gears to a corresponding shaft among the intermediate shaft, the first output shaft and the second output shaft.

11. The power transmission apparatus of claim 10, wherein the four synchronizers comprise:

a first synchronizer selectively synchronously connecting the third shifting gear of the third gear set or the first shifting gear of the seventh gear set to the intermediate shaft;

a second synchronizer selectively synchronously connecting the sixth shifting gear of the fourth gear set or the second shifting gear of the sixth gear set to the second output shaft;

a third synchronizer selectively synchronously connecting the fourth shifting gear of the fourth gear set or the reverse shifting gear of the sixth gear set to the first output shaft; and a fourth synchronizer selectively synchronously connecting the fifth shifting gear of the first gear set to the second output shaft.

12. The power transmission apparatus of claim 9, wherein:

the plurality of gear sets are arranged in the order of the first, second, fifth, third, fourth, sixth, seventh and eighth gear sets from an opposite side of the engine; and the third and fourth gear sets are disposed in the same row.

13. The power transmission apparatus of claim 9, wherein the power transmission apparatus realizes an engine mode in which the engine is driven, an electric vehicle mode in which the motor/generator is driven, and a parallel mode in which the engine and the motor/generator are driven.

14. The power transmission apparatus of claim 13, wherein the power transmission apparatus realizes six forward speeds in each driving mode, and wherein the first and third shifting gears realizing a forward first speed and a forward third speed are configured on the intermediate shaft to transfer the rotational power transmitted from the first input shaft to the first output shaft via the idle shaft.

15. The power transmission apparatus of claim 13, wherein:

the first and third shifting gears selectively transfer the rotational power transmitted from the first input shaft through the second gear set to the idle shaft via the seventh and third gear sets respectively; and the rotational power transmitted to the idle shaft is transferred to the first output shaft via the fifth gear set.

16. The power transmission apparatus of claim 13, wherein the power transmission apparatus realizes six forward speeds and one reverse speed in each driving mode, and wherein the reverse shifting gear realizing the reverse speed is configured on the first output shaft to receive the rotational power transmitted from the second input shaft via the second shifting gear on the second output shaft.

* * * * *